Sept. 18, 1945.  F. D. KENDRICK  2,384,930
INSECT TRAP
Filed April 29, 1942
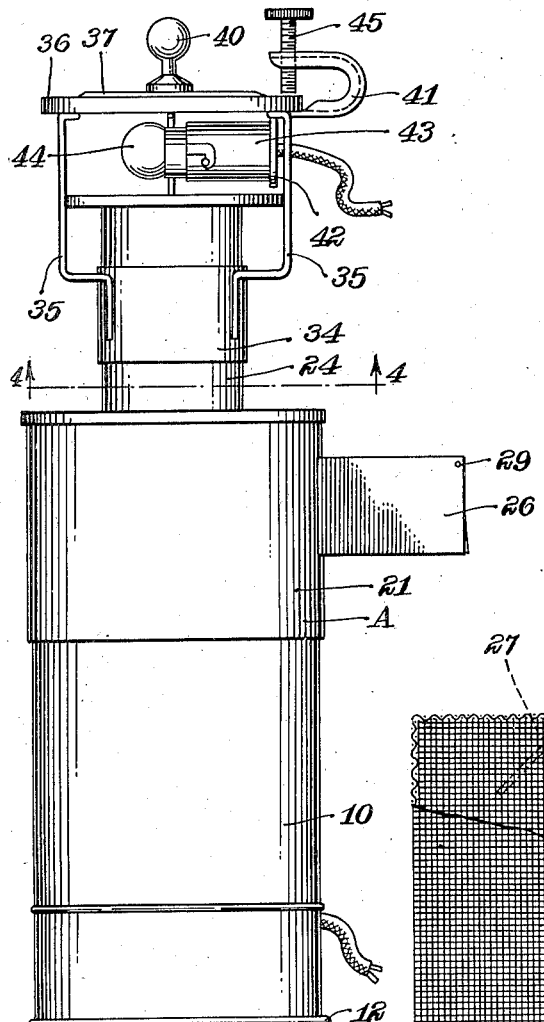
Fig. 1
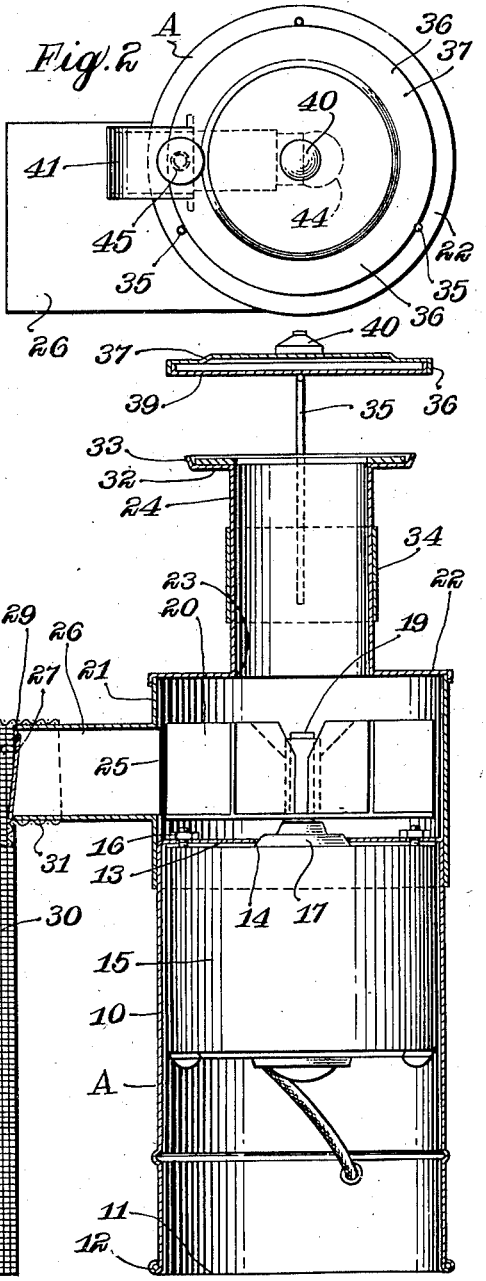
Fig. 2
Fig. 3
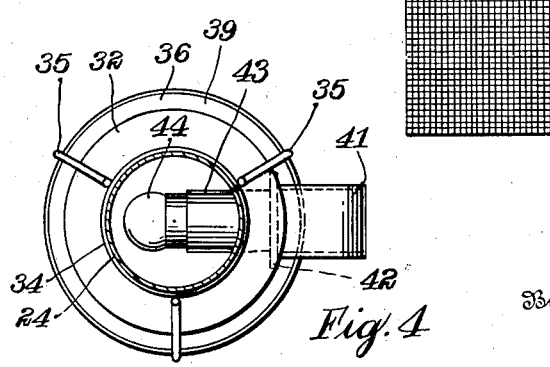
Fig. 4
Inventor
Fayette D. Kendrick
By Robert M. Dunning
Attorney Patented Sept. 18, 1945

2,384,930

UNITED STATES PATENT OFFICE 2,384,930

INSECT TRAP

Fayette D. Kendrick, St. Paul, Minn.

Application April 29, 1942, Serial No. 440,932

1 Claim. (Cl. 43—113)

My invention relates to an improvement in insect traps, wherein it is desired to provide a device for catching flies, mosquitoes, and other insects.

The object of the present invention is to provide a means of trapping insects through the use of suction. My device acts to draw flies, mosquitoes, or other insects into a suction chamber and to force them into a screened receptacle or the like. As a result, the insects are exterminated quickly and quietly and are deposited in a suitable receptacle from which they may be removed and discarded from time to time.

A feature of the present invention lies in the provision of a means for attracting the insects to the inlet of my device. This means may vary according to the type of insect prevalent at the point where my trap is used. For example, I provide a shallow tray which may contain a sweet material to attract flies. I may also embody a light to attract mosquitoes and certain other insects. The bait used or the means provided for attracting the insects may vary according to the particular type of insect which exists where the trap is used.

A feature of the present invention lies in the provision of a suction inlet which acts to draw the insects into the trap if the insect is flying in the vicinity of the inlet. The means for attracting the insect is placed closely adjacent this suction inlet. When the attracted insect approaches the inlet the suction draft draws the same into the suction chamber and deposits the insect into a suitable receptacle from which it can not escape in case the insect is still alive after passing through the trap.

A feature of the present invention lies in the provision of a means of varying the inlet so as to provide the necessary suction for attracting various insects. For certain insects the inlet may be relatively large, thereby reducing the velocity of the air passing in the adjustable portion of the inlet. The inlet may be decreased in size to increase the velocity of air passing therethrough, when it is found necessary or desirable.

An important feature of the present invention lies in the fact that the suction inlet is arranged to extend vertically so as to draw the insect downwardly into the suction chamber. This feature is of extreme advantage as the weight of the insect tends to assist the action of the suction. An insect passing near the inlet is drawn into the same by the movement of the air in a downwardly direction and gravity assists in drawing the insect into the trap.

A further feature of the present invention lies in the provision of an automatic closure provided on the air outlet of the trap so as to form a partition between the insect receptacle and the body of the trap. This closure opens automatically when the trap is in operation and closes when the trap is stopped so as to prevent insects within the trap from escaping therefrom.

These and other objects and novel features of my invention will be more clearly and fully set forth in the following specification and claim.

In the drawing forming a part of my specification:

Figure 1 is a side elevational view of my insect trap in readiness for operation.

Figure 2 is a top plan view of the trap.

Figure 3 is a vertical section through the trap showing the removable insect compartment attached thereto.

Figure 4 is a sectional view taken on a horizontal plane along the line 4—4 of Figure 1.

The trap A is preferably arranged to stand on a generally vertical axis so that the air will be drawn in a downward direction into the inlet of the trap. The device A includes a substantially cylindrical housing 10 which is preferably open at its lower extremity 11. A beaded bearing edge 12 encircles the lower end of the casing to prevent the device from marring the surface upon which the device is placed. The casing 10 is provided with a closure top 13 having a central opening 14 therethrough to provide an aperture for the motor shaft as will be later pointed out in detail.

An electrical motor 15 is provided within the casing 10 and is secured in place by bolts 16 extending through the top 13. A central boss 17 is provided on the motor 15, which includes a bearing and the motor shaft 19. The boss 17 extends through the opening 14 and the shaft 19 projects above the boss.

A fan 20 is mounted on the shaft 19 to rotate therewith. This fan is shaped to draw in air from an axial or central intake aperture and to propel the air outwardly at right angles to the fan axis. When in operation the motor 15 drives the fan 20 at a high rate of speed providing a considerable suction in the intake to the fan.

Secured in telescopic relation to the casing 10, I provide a fan casing sleeve 21. This fan casing sleeve 21 is of a diameter to frictionally engage the casing 10 and to be supported thereby. The lower end of the casing 21 is open so as to fit tightly about the casing 10. The cylindrical casing 21 is provided with a closed top 22 having a central opening 23 therein. An elongated cap including an intermediate portion comprising a substantially cylindrical inlet sleeve 24 is secured in the opening 23 and air is drawn through this sleeve 24 into the suction chamber 25 within the fan casing 21.

A fan outlet 26 is secured to the casing 21 and preferably extends substantially tangent to the blades of the fan. Thus during rotation of the fan 20 air is forced through the outlet passage 26 carrying insects drawn through the inlet sleeve 24.

An automatically operable closure 27 is hinged at 29 near the mouth of the outlet passage 26. This closure 27 normally assumes a substantially vertical position due to gravity. When the fan 20 is in operation, however, the force of air passing through the passage 26 pivots the closure into open position as indicated in dotted outline in Figure 3 of the drawing.

A receptacle 30 is provided to receive the insects forced through the outlet passage 26. This receptacle 30 may be formed of screen or any porous material, such as cloth, and is provided with a sleeve 31 which encircles the outlet 26 and is secured to the mouth of the outlet passage. Thus the air forced through the outlet passage 26 passes through the walls of the receptacle 30, but the insects propelled with the air are retained within the receptacle.

At the upper extremity of the inlet sleeve 24, I provide an outwardly extending dished flange 32 provided with an upstanding marginal edge 33. A tray is thus formed which may be used to support bait of any suitable type to draw insects toward my device. For example a ring-shaped piece of absorbent material, such as a blotter or the like, may be impregnated with a sweet material, such as syrup, so as to attract flies toward the device A. The suction is sufficiently strong so that when the insect nears the flange 32 it is drawn into the device and deposited in the receptacle 30.

A sleeve 34 encircles the sleeve 24 and frictionally engages the same. The sleeve 34 supports a series of angularly spaced wire brackets or supporting means, such as 35, which are secured to the top deflector element 36. The element 36 serves as a cover for the inlet opening or sleeve 24 to prevent articles from dropping into the interior of the device A. The top element 36 includes a covering disc 37 and a reflecting element 39 marginally secured together. A knob 40 is provided on the top of the element 36 by means of which the top may be adjusted vertically with respect to the flange 32.

A U-shaped bracket 41 is designed to fit over the top element 36 and to embrace a portion of the edge thereof. A flange 42 projects downwardly from one end of this bracket to support a horizontally projecting socket 43 and a light bulb 44. A thumb screw 45 extends through the bracket 41 near one end thereof, designed to clamp against the upper surface of the top element 36. Thus by this simple bracket 41 the light bulb 44 may be suspended over the inlet sleeve 24 to attract insects toward the trap A. This light bulb may be of any desired color to attract any particular insect.

The operation of my trap is believed obvious from the foregoing description. The motor 15 is connected to a suitable source of supply of electrical current, and the light bulb 44 is also connected to this current supply. When the motor is turned on through the use of a suitable switch, the fan 20 rotates at a high rate of speed drawing in air through the intake sleeve 24 and blowing this air outwardly through the outlet passage 26 and into the receptacle 30. Any insect flying near the inlet sleeve is drawn into the suction inlet and is trapped in the receptacle 30. Any suitable means is used to attract insects to the trap, such as bait placed about the inlet, or a light bulb, such as 44.

I provide a clear horizontal passage directly above the suction inlet. When the insects fly horizontally through this unobstructed passage, the suction from beneath the insect assists gravity in drawing the insect downwardly into the trap.

In accordance with the patent statutes, I have described the principles of construction and operation of my trap, and while I have endeavored to set forth the best embodiment thereof, I desire to have it understood that obvious changes may be made within the scope of the following claim without departing from the spirit of my invention.

I claim:

An insect trap including a cylindrical casing, a sleeve slidably and removably mounted on the upper end thereof, said sleeve having an elongated cap thereon, the upper end of the cap being provided with a dished flange, an intermediate portion of the cap having a diameter less than the lower portion of the cap and the dished flange, means surrounding said intermediate portion and slidably mounted thereon, supporting means secured to the first means and extending upwardly therefrom, a deflector secured to the supporting means, said first means being positioned in close fitting relation to said intermediate portion and adapted to be adjustably positioned along the length thereof to vary the space between the deflector and the dished flange, a motor within the casing, a fan connected to the motor for actuation thereby, the axis of the fan being coaxial with the intermediate portion of the cap, said sleeve also having a tube in the side wall thereof communicating with the effective zone of the fan, means extending from the tube for receiving insects directed thereto by the fan, and means in the tube to prevent escape of the insects from the receiving means when the operation of the fan is discontinued.

FAYETTE D. KENDRICK.